United States Patent
Jain et al.

(10) Patent No.: US 11,488,145 B2
(45) Date of Patent: Nov. 1, 2022

(54) METHOD AND SYSTEM FOR USER-BASED DISTRIBUTED LEDGERS

(71) Applicant: MASTERCARD INTERNATIONAL INCORPORATED, Purchase, NY (US)

(72) Inventors: Ayushi Jain, Madhya Pradesh (IN); Ankur Sarwate, New Delhi (IN); Sidharth Goel, Pujab (IN); Chandan Garg, Haryana (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 407 days.

(21) Appl. No.: 16/820,831

(22) Filed: Mar. 17, 2020

(65) Prior Publication Data

US 2021/0295313 A1    Sep. 23, 2021

(51) Int. Cl.
  *G06Q 20/36*   (2012.01)
  *G06Q 20/38*   (2012.01)
  (Continued)

(52) U.S. Cl.
  CPC ..... *G06Q 20/3674* (2013.01); *G06Q 20/3678* (2013.01); *G06Q 20/3827* (2013.01);
  (Continued)

(58) Field of Classification Search
  CPC ........... G06Q 20/3674; G06Q 20/3678; G06Q 20/3827; G06Q 20/3829; G06Q 20/401;
  (Continued)

(56) References Cited

U.S. PATENT DOCUMENTS

| 11,314,729 B2 * | 4/2022 | Saito | H04L 9/3239 |
| 2022/0051236 A1 * | 2/2022 | Wright | G06Q 20/02 |

OTHER PUBLICATIONS

Maharjan ("Performance Analysis of Blockchain Platforms", Thesis for Master of Science in Computer Science, University of Nevada, Las Vegas, Jan. 24, 2019, 51 pages) (Year: 2019).*

(Continued)

*Primary Examiner* — James D Nigh
(74) *Attorney, Agent, or Firm* — Panitch Schwarze Belisario & Nadel LLP (57) ABSTRACT

A method for processing cryptographic currency transactions through user-based blockchain ledgers includes: receiving, by blockchain node in a blockchain network, a new cryptographic currency transaction from a first computing device including unspent transaction outputs, a sender public key, receiver public key, destination address, and cryptographic currency amount; identifying, by the blockchain node, a sending blockchain associated with the sender public key including the unspent transaction outputs; validating, by the blockchain node, the sending blockchain by generating a hash value using the sending blockchain and comparing the generated hash value to a historic sender hash value associated with the sender public key; generating, by the blockchain node, a new sender hash value by hashing a combination of the sending blockchain and the new cryptographic currency transaction; and transmitting, by the blockchain node, the generated new sender hash value to a plurality of additional nodes in the blockchain network.

16 Claims, 5 Drawing Sheets

(51) Int. Cl.
  *G06Q 20/40* (2012.01)
  *H04L 9/00* (2022.01)
  *H04L 9/06* (2006.01)
  *H04L 9/32* (2006.01)

(52) U.S. Cl.
  CPC ....... *G06Q 20/3829* (2013.01); *G06Q 20/401* (2013.01); *H04L 9/0637* (2013.01); *H04L 9/0643* (2013.01); *G06Q 2220/00* (2013.01); *H04L 9/50* (2022.05); *H04L 2209/56* (2013.01)

(58) Field of Classification Search
  CPC . G06Q 2220/00; H04L 9/0637; H04L 9/0643; H04L 9/50; H04L 9/3239; H04L 2209/56
  USPC .......................................................... 705/67
  See application file for complete search history.

(56) References Cited

OTHER PUBLICATIONS

Tasca et al. ("A Taxonomy of Blockchain Technologies: Principles of Identification and Classification", ledgerjournal.org, Ledger vol. 4 (2019) 1-39, 39 pages) (Year: 2019).*

Wang et al. ("A Survey on Consensus Mechanism and Mining Strategy Management in Blockchain Networks", arXiv:1805.02707v4, Feb. 19, 2019, 40 pages) (Year: 2019).*

* cited by examiner

METHOD AND SYSTEM FOR USER-BASED DISTRIBUTED LEDGERS

FIELD

The present disclosure relates to processing cryptographic currency transactions through user-based blockchain ledgers, specifically the use of separate blockchains for each user where blockchain nodes store hashes of user ledgers to maintain accuracy.

BACKGROUND

Blockchain was initially created as a storage mechanism for use in conducting payment transactions with a cryptographic currency. Using a blockchain provides a number of benefits, such as decentralization, distributed computing, transparency regarding transactions, and yet also providing anonymity as to the individuals or entities involved in a transaction. One of the more popular aspects of a blockchain is that it is an immutable record: every transaction ever that is part of the chain is stored therein and cannot be changed due to the computational requirements and bandwidth limitations, particularly as a chain gets longer and a blockchain network adds more nodes.

However, while the immutability strengthens as the chain gets longer, the amount of time it takes for blockchain nodes to confirm a transaction can also increase. As each new transaction relies on a prior transaction, the further back the earlier transactions date, the more and more blocks must be examined and verified by the blockchain node, which can add significant time and resources to the process, which can also delay subsequent transactions as well. Thus, there is a need for a technical system that can provide for faster analysis and processing for transaction confirmations in a blockchain network regardless of date of referenced transactions.

SUMMARY

The present disclosure provides a description of systems and methods for processing cryptographic currency transactions through user-based blockchain ledgers. Instead of all transactions for all users being stored in a single blockchain, each user (e.g., blockchain wallet) has their own associated blockchain, where any sending or receiving for a transaction is stored therein. The blockchain network stores a hash of each user's blockchain, which can be used to validate a user's blockchain as part of a confirmation process for a new transaction. Thus, only the users themselves need to store copies of their blockchains, reducing data sizes necessary for blockchain nodes, while at the same time the hash enables validation to be performed by blockchain nodes by comparing the hash looking at only the user's blockchain. As a result, every transaction can be confirmed using only the length of the involved users' transaction histories, which significantly reduces the number of blocks that must be analyzed to confirm a new blockchain transaction. Thus, the methods and systems discussed herein provide for faster confirmations that require less blockchain node resources, while at the same time enabling the blockchain network to operate using less data sizes.

A method for processing cryptographic currency transactions through user-based blockchain ledgers includes: receiving, by a receiver of a blockchain node in a blockchain network, a new cryptographic currency transaction from a first computing device, where the new cryptographic currency transaction includes at least (i) one or more unspent transaction outputs, (ii) a sender public key, (iii) a receiver public key, (iv) a destination address, and (v) a cryptographic currency amount; identifying, by a processor of the blockchain node, a sending blockchain associated with the sender public key, where the sending blockchain is comprised of a plurality of blocks including one or more blocks including the one or more unspent transaction outputs; validating, by the processor of the blockchain node, the sending blockchain by generating a hash value using the sending blockchain and comparing the generated hash value to a historic sender hash value associated with the sender public key; generating, by the processor of the blockchain node, a new sender hash value by hashing a combination of the sending blockchain and the new cryptographic currency transaction; and transmitting, by a transmitter of the blockchain node, the generated new sender hash value to a plurality of additional nodes in the blockchain network.

A system for processing cryptographic currency transactions through user-based blockchain ledgers includes: a blockchain network; a plurality of additional nodes included in the blockchain network; a first computing device; and a blockchain node in the blockchain network including a receiver receiving a new cryptographic currency transaction from a first computing device, where the new cryptographic currency transaction includes at least (i) one or more unspent transaction outputs, (ii) a sender public key, (iii) a receiver public key, (iv) a destination address, and (v) a cryptographic currency amount; a processor identifying a sending blockchain associated with the sender public key, where the sending blockchain is comprised of a plurality of blocks including one or more blocks including the one or more unspent transaction outputs, validating the sending blockchain by generating a hash value using the sending blockchain and comparing the generated hash value to a historic sender hash value associated with the sender public key, and generating a new sender hash value by hashing a combination of the sending blockchain and the new cryptographic currency transaction, and a transmitter transmitting the generated new sender hash value to a plurality of additional nodes in the blockchain network.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Processing Blockchain Transactions Through User-Based Ledgers

Figure 1:
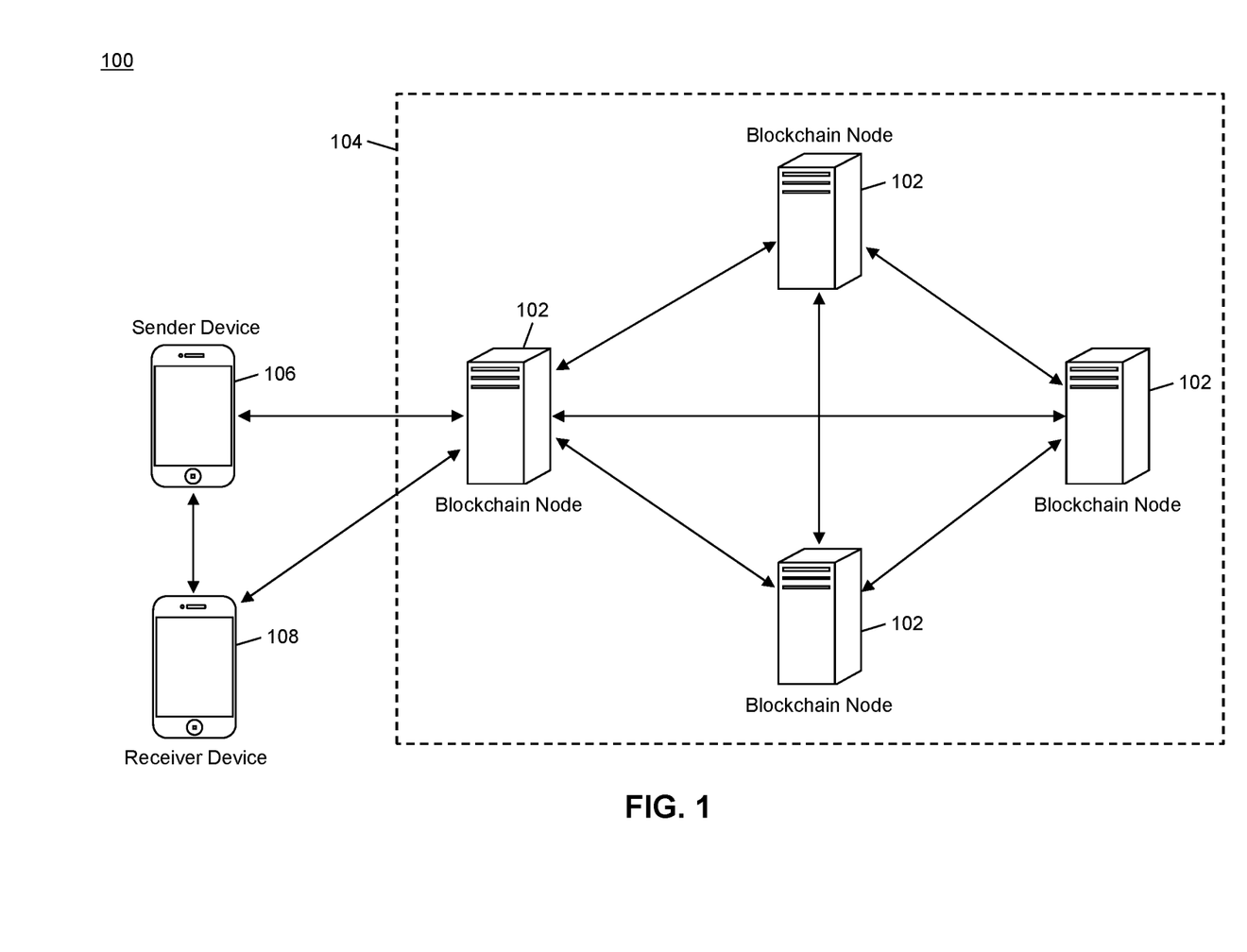
FIG. 1 is a block diagram illustrating a high level system architecture for processing blockchain transactions using user-based ledgers in accordance with exemplary embodiments.

FIG. 1 illustrates a system 100 for processing cryptographic currency transactions in a blockchain network through the use of user-based blockchain ledgers and ledger hash values.

Figure 2:
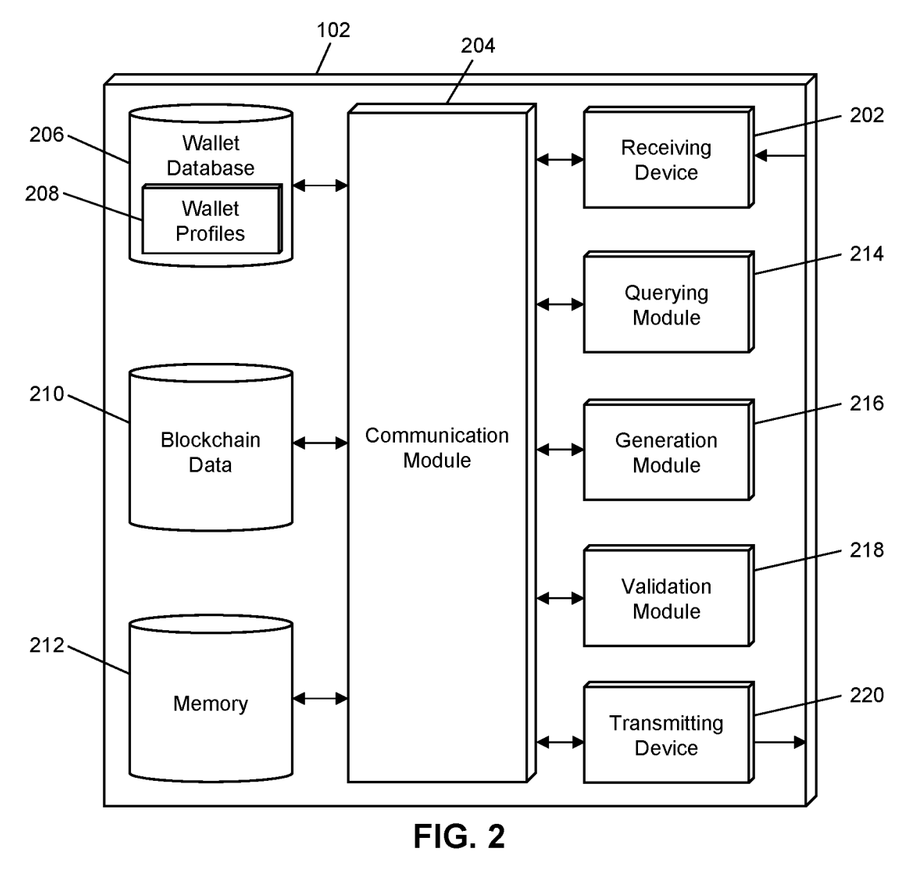
FIG. 2 is a block diagram illustrating a blockchain node of the system of FIG. 1 for processing a blockchain transaction using a user-based ledger in accordance with exemplary embodiments.
Figure 5:
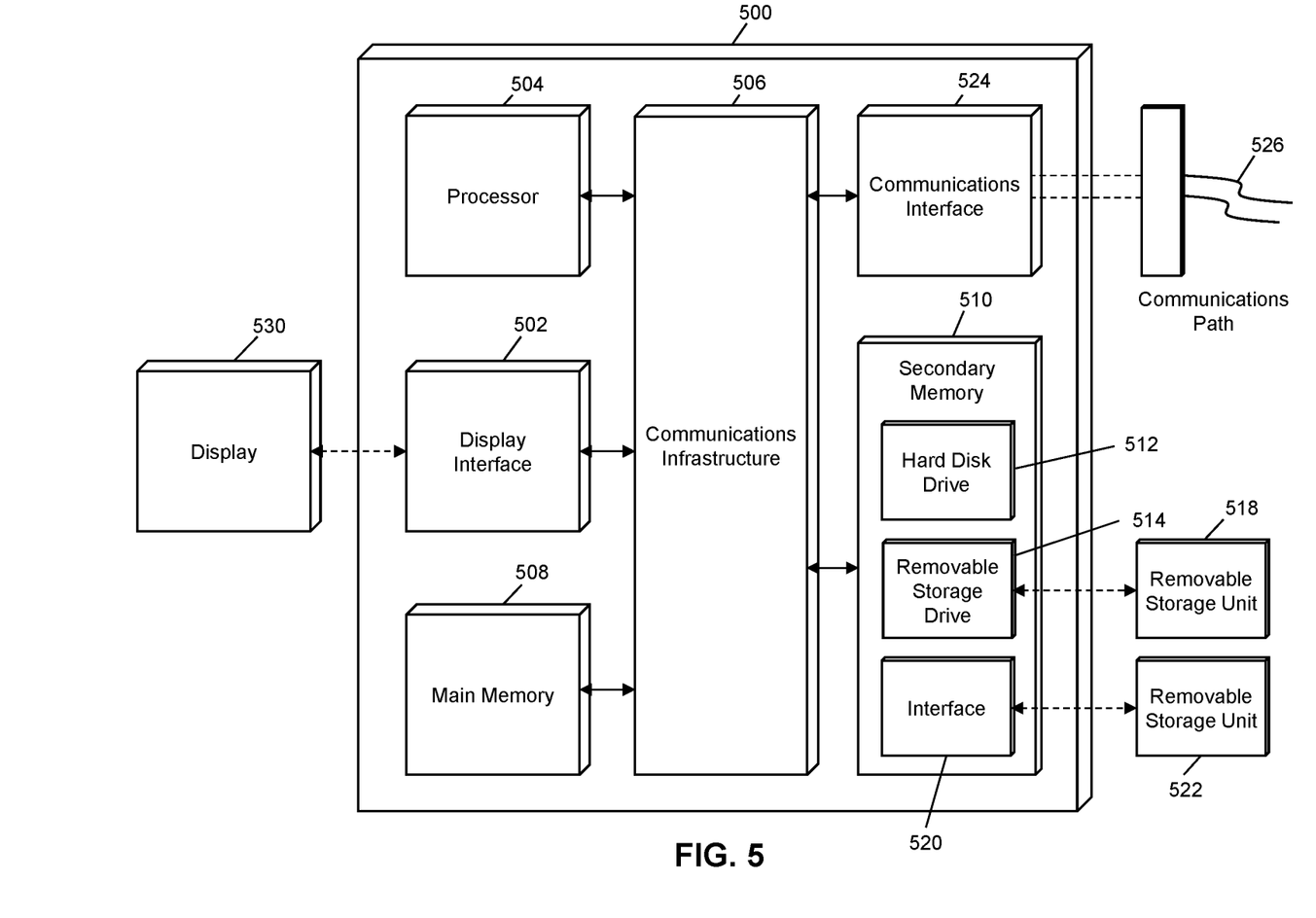
FIG. 5 is a block diagram illustrating a computer system architecture in accordance with exemplary embodiments.

The system 100 may include a blockchain network 104. The blockchain network 104 may be comprised of a plurality of blockchain nodes 102. Each blockchain node 102 may be a computing system, such as illustrated in FIGS. 2 and 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain.

The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network 104 prior to the generation and addition of a new block to the blockchain in order for the change to be made permanent. Computational and communication limitations may make such a modification exceedingly difficult, if not impossible, thus rendering the blockchain immutable.

In some embodiments, the blockchain may be used to store information regarding blockchain transactions conducted between two different blockchain wallets. A blockchain wallet may include a private key of a cryptographic key pair that is used to generate digital signatures that serve as authorization by a payer for a blockchain transaction, where the digital signature can be verified by the blockchain network 104 using the public key of the cryptographic key pair. In some cases, the term "blockchain wallet" may refer specifically to the private key. In other cases, the term "blockchain wallet" may refer to a computing device (e.g., sender device 106 and receiver device 108) that stores the private key for use thereof in blockchain transactions. For instance, each computing device may each have their own private key for respective cryptographic key pairs, and may each be a blockchain wallet for use in transactions with the blockchain associated with the blockchain network. Computing devices may be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain may correspond to a blockchain transaction or other storage of data, as applicable. A blockchain transaction may consist of at least: a digital signature of the sender of currency (e.g., a sender device 106) that is generated using the sender's private key, a blockchain address of the recipient of currency (e.g., a receiver device 108) generated using the recipient's public key, and a blockchain currency amount that is transferred or other data being stored. In some blockchain transactions, the transaction may also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction may also include the sender's public key, for use by an entity in validating the transaction. For the traditional processing of a blockchain transaction, such data may be provided to a blockchain node 102 in the blockchain network 104, either by the sender or the recipient. The node may verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block may be validated by other nodes in the blockchain network 104 before being added to the blockchain and distributed to all of the blockchain nodes 102 in the blockchain network 104 in traditional blockchain implementations. In cases where a blockchain data value may not be related to a blockchain transaction, but instead the storage of other types of data, blockchain data values may still include or otherwise involve the validation of a digital signature.

In the system 100, user-based blockchain ledgers may be used in place of a traditional blockchain managed by the blockchain network 104. Instead of a single blockchain that stores blockchain data values for all transactions conducted in the blockchain network, a separate blockchain ledger may be used for each blockchain wallet, such as a separate blockchain for the sender device 106 and another separate blockchain for the receiver device 108. The user-based blockchain ledgers may include blockchain data values for all transactions involving the associated blockchain wallet, including all transfers of cryptographic currency from the blockchain wallet and all transfers of cryptographic currency to the blockchain wallet. In some cases, the blockchain data values stored in each user-based blockchain may include the full data included in a traditional blockchain data value for a transaction, such as a digital signature, unspent transaction output(s), destination address(es), cryptocurrency amount(s), etc.

Each user may store a copy of their blockchain in their computing device, such as the sender device 106 storing its own blockchain and the receiver device 108 storing its own blockchain. In some embodiments, blockchain nodes 102 may not store a copy of any user-based blockchain. In other embodiments, some blockchain nodes 102 may obtain copies of user-based blockchains that may be stored in memory thereof, such as may be received and retained during the processing of a transaction as discussed herein.

Each blockchain node 102 in the blockchain network 104 may store a hash value for each blockchain wallet that is representative of the associated user-based blockchain. In some embodiments, hash values may be stored in a relational database or other storage mechanism in each blockchain node 102. In other embodiments, a main blockchain may be used to store the hash values, where each blockchain data value included therein may include a public key of the associated blockchain wallet and the latest hash value for the corresponding user-based blockchain. Public keys of blockchain wallets may be used as identifiers in interactions with the blockchain node 102. For instance, a public key may be used to identify a hash value, a computing device, a user-based blockchain, etc., as the public key may be unique to that blockchain wallet.

A hash value for a user-based blockchain may be generated by applying a hashing algorithm to the complete user-based blockchain. In an exemplary embodiment, the hashing algorithm may be a one-way, collision-resistant hashing algorithm, such as Secure Hash Algorithm 256. The hashing algorithm may be one-way such that it may be computationally impossible to generate or identify the blockchain that was used to generate the resulting hash value from the hash value itself.

The hash value may be used to validate a user-based blockchain as part of the confirmation process for a newly submitted blockchain transaction. In the system 100, the sender device 106 may submit a new blockchain transaction to a blockchain node 102 for the transfer of cryptographic currency from the sender device's blockchain wallet to the receiver device's blockchain wallet. The blockchain transaction may include or be accompanied by the public key for both blockchain wallets involved in the blockchain transaction. The blockchain node 102 may identify the hash value that is stored for each of the user-based blockchain ledger. The blockchain node 102 may then obtain a copy of each user's blockchain, such as from the users themselves (e.g., from the sender device 106 and/or receiving device 108) or from other blockchain nodes 102 in the blockchain network 104 that may store a copy of the latest user-based blockchain, such as may be identifiable with the associated public key. In some cases, the receiver device 108 may provide a copy of its blockchain to the sender device 106 along with a destination blockchain address, where the sender device 106 may transmit a copy of the user-based blockchain for both blockchain wallets to the blockchain node 102 along with the other data for the new blockchain transaction.

Once the blockchain node 102 has obtained the user-based blockchains, the blockchain node 102 may generate the hash value for each blockchain. The generated hash values may then be compared to the stored hash values to validate the user-based blockchains. If the hash values do not match, it means that the copy of the blockchain being provided to the blockchain node 102 is incorrect. In such instances, the blockchain node 102 may halt processing of the new blockchain transaction and notify the sender device 106 and/or receiver device 108 accordingly, which may be done to prevent fraud due to an attempted modification to a user-based blockchain. If the values match, it means that the copy of the user-based blockchain provide is complete and accurate. The blockchain node 102 may then confirm the blockchain transaction using traditional processes, such as by validating the unspent transaction outputs, validating the digital signature, ensuring there is sufficient cryptocurrency associated with the transaction outputs to cover the transfer amount(s), etc. If there is any failure in the confirmation, the new transaction may not be added to blockchain network 104 and the sender device 106 and receiver device 108 notified accordingly.

If the new blockchain transaction is successfully confirmed, then a new blockchain data value for the new blockchain transaction may be stored in the user-based blockchain for both the sender device 106 and the receiver device 108 (e.g., and any other blockchain wallets involved in the transaction). The new blockchain data value may be the complete blockchain data value for the transaction, or may include only such data as is relevant to the blockchain wallet, which may be dependent on if the blockchain wallet is a sender or recipient in the new blockchain transaction. In some cases, the blockchain node 102 may transmit the new blockchain data value to the sender device 106 and the receiver device 108 using a suitable communication network and method, where the computing device may update its blockchain accordingly. In other cases, the blockchain node 102 may generate a new block for each user-based blockchain ledger that includes the corresponding new blockchain data value and transmit the completed, updated blockchain to the requisite blockchain wallet's computing device.

When a user-based blockchain is updated with a new transaction, the blockchain node 102 may generate a new hash value for that blockchain. The new hash value may then be distributed to every blockchain node 102 in the blockchain network 104. In cases where a main blockchain is used, the new hash value may be stored in a new blockchain data value with the corresponding public key that is included in a new block, which may be distributed to other blockchain nodes 102 for confirmation and addition to the main blockchain using traditional methods. The new hash values may then be used in subsequent transactions, which may only be validated by use of accurate, updated copies of the associated user-based blockchain ledger.

In some embodiments, validation of a user-based blockchain ledger as part of a new transaction may only be performed for the sender device's blockchain wallet. In such cases, the blockchain for the receiver device 108 may be updated, but its hash value may not be validated during confirmation of the new blockchain transaction, such as due to the receiver device 108 only receiving cryptocurrency.

The methods and systems discussed herein provide a blockchain network 104 that utilizes user-based blockchain ledgers, where each blockchain wallet has its own separate blockchain, and where the blockchain network 104 itself only maintains a copy of a hash value of each blockchain wallet's blockchain, either in a main blockchain or other suitable storage mechanism. The result is that confirmation of a transaction requires analysis only with respect to validating the hash value for the blockchain and checking through transactions in the sender's blockchain wallet, which can greatly improve the speed of transaction confirmation and reduce the consumption of network resources. In addition, because each blockchain node 102 needs to only store a hash value for each of the blockchain wallets, instead of a full copy of every blockchain transaction, the storage space required in each blockchain node 102 is also significantly reduced from traditional blockchain networks 104. Thus, the methods and systems discussed herein maintain all of the benefits of a traditional blockchain, while providing faster and more efficient processing and a reduction in storage size.

Blockchain Node

FIG. 2 illustrates an embodiment of the blockchain node 102 in the system 100. It will be apparent to persons having skill in the relevant art that the embodiment of the blockchain node 102 illustrated in FIG. 2 is provided as illustration only and may not be exhaustive to all possible configurations of the blockchain node 102 suitable for performing the functions as discussed herein. For example, the computer system 500 illustrated in FIG. 5 and discussed in more detail below may be a suitable configuration of the blockchain node 102.

The blockchain node 102 may include a receiving device 202. The receiving device 202 may be configured to receive data over one or more networks via one or more network protocols. In some instances, the receiving device 202 may be configured to receive data from other blockchain nodes 102, sender devices 106, receiver devices 108, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by other blockchain nodes 102 that may be superimposed or otherwise encoded with new transactions for confirmation, confirmed blockchain transactions, new blocks for confirmation, confirmed blocks for addition to the blockchain, messages regarding block confirmations, user-based blockchains, blockchain hash values, etc. The receiving device 202 may also be configured to receive data signals electronically transmitted by sender devices 106 and/or receiver devices 108, which may be superimposed or otherwise encoded with new blockchain transactions, public keys, digital signatures, user-based blockchain ledgers, etc.

The blockchain node 102 may also include a communication module 204. The communication module 204 may be configured to transmit data between modules, engines, databases, memories, and other components of the blockchain node 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the blockchain node 102 and external components of the blockchain node 102, such as externally connected databases, display devices, input devices, etc. The blockchain node 102 may also include a processing device. The processing device may be configured to perform the functions of the blockchain node 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, validation module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The blockchain node 102 may include a wallet database 206. The wallet database 206 may be configured to store one or more wallet profiles 208 using a suitable data storage format and schema. The wallet database 206 may be a relational database that utilizes structured query language for the storage, identification, modifying, updating, accessing, etc. of structured data sets stored therein. Each wallet profile 208 may be a structured data set configured to store data related to a blockchain wallet. A wallet profile 208 may include, for example, a public key of the associated cryptographic key pair, the latest hash value generated using the related blockchain wallet's user-based blockchain ledger, and, if applicable, a copy of the related user-based blockchain ledger. In some embodiments, wallet profile 208 data may be stored in a main blockchain instead of a wallet database 206.

The blockchain node 102 may also include a memory 212. The memory 212 may be configured to store data for use by the blockchain node 102 in performing the functions discussed herein, such as public and private keys, symmetric keys, etc. The memory 212 may be configured to store data using suitable data formatting methods and schema and may be any suitable type of memory, such as read-only memory, random access memory, etc. The memory 212 may include, for example, encryption keys and algorithms, communication protocols and standards, data formatting standards and protocols, program code for modules and application programs of the processing device, and other data that may be suitable for use by the blockchain node 102 in the performance of the functions disclosed herein as will be apparent to persons having skill in the relevant art. In some embodiments, the memory 212 may be comprised of or may otherwise include a relational database that utilizes structured query language for the storage, identification, modifying, updating, accessing, etc. of structured data sets stored therein. The memory 212 may be configured to store, for example, cryptographic keys, salts, nonces, communication information for blockchain nodes 102 and blockchain networks 104, address generation and validation algorithms, digital signature generation and validation algorithms, hashing algorithms for generating reference values, rules regarding generation of new blocks and block headers, a pool of pending transactions, hash values, user-based blockchains, etc.

The blockchain node 102 may also include blockchain data 210, which may be stored in the memory 212 of the blockchain node 102 or stored in a separate area within the blockchain node 102 or accessible thereby. The blockchain data 210 may include a blockchain, which may be comprised of a plurality of blocks and be associated with the blockchain network 104. In some cases, the blockchain data 210 may further include any other data associated with the blockchain and management and performance thereof, such as block generation algorithms, digital signature generation and confirmation algorithms, communication data for blockchain nodes 102, etc. The blockchain data 210 may also include a main blockchain, if applicable, user-based blockchain data, blockchain hash values, etc.

The blockchain node 102 may include a querying module 214. The querying module 214 may be configured to execute queries on databases to identify information. The querying module 214 may receive one or more data values or query strings, and may execute a query string based thereon on an indicated database, such as the memory 212 of the blockchain node 102 to identify information stored therein. The querying module 214 may then output the identified information to an appropriate engine or module of the blockchain node 102 as necessary. The querying module 214 may, for example, execute a query on the wallet database 206, memory 212, or blockchain data 210 to identify a hash value to validate a user-based blockchain received as part of a new blockchain transaction.

The blockchain node 102 may also include a generation module 216. The generation module 216 may be configured to generate data for use by the blockchain node 102 in performing the functions discussed herein. The generation module 216 may receive instructions as input, may generate data based on the instructions, and may output the generated data to one or more modules of the blockchain node 102. For example, the generation module 216 may be configured to generate new blockchain data values, new block headers, Merkle roots, new blocks, and other data for operation of the blockchain. The generation module 216 may also be configured to generate new blockchain data values and blocks for user-based blockchain ledgers, and to also generate hash values for user-based blockchain ledgers.

The blockchain node 102 may also include a validation module 218. The validation module 218 may be configured to perform validations for the blockchain node 102 as part of the functions discussed herein. The validation module 218 may receive instructions as input, which may also include data to be used in performing a validation, may perform a validation as requested, and may output a result of the validation to another module or engine of the blockchain node 102. The validation module 218 may, for example, be configured to confirm blockchain transactions by analyzing blockchain data values in the blockchain to ensure that the sender device 106 is authorized to use the transaction outputs included in the new transaction submission and that the transaction outputs have not been previously used to transfer currency in another transaction. The validation module 218 may also be configured to validate digital signatures using public keys and suitable signature generation algorithms, as well as to validate hash values for user-based blockchain ledgers as discussed above.

The blockchain node 102 may also include a transmitting device 220. The transmitting device 220 may be configured to transmit data over one or more networks via one or more network protocols. In some instances, the transmitting device 220 may be configured to transmit data to other blockchain nodes 102, sender devices 106, receiver devices 108, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to blockchain nodes 102 that are superimposed or otherwise encoded with new blockchain data values, new blocks for confirmation, confirmed blocks, messages regarding block or transaction confirmations, user-based blockchain ledgers, hash values, and other data used in the operation and management of the blockchain. The transmitting device 220 may also be configured to electronically transmit data signals to sender devices 106 and/or receiver devices 108, which may be superimposed or otherwise encoded with confirmation requests, notifications regarding transaction processing, user-based blockchain updates, user-based blockchain requests, etc.

Processing of a Blockchain Transaction for User-Based Blockchains

Figure 3:
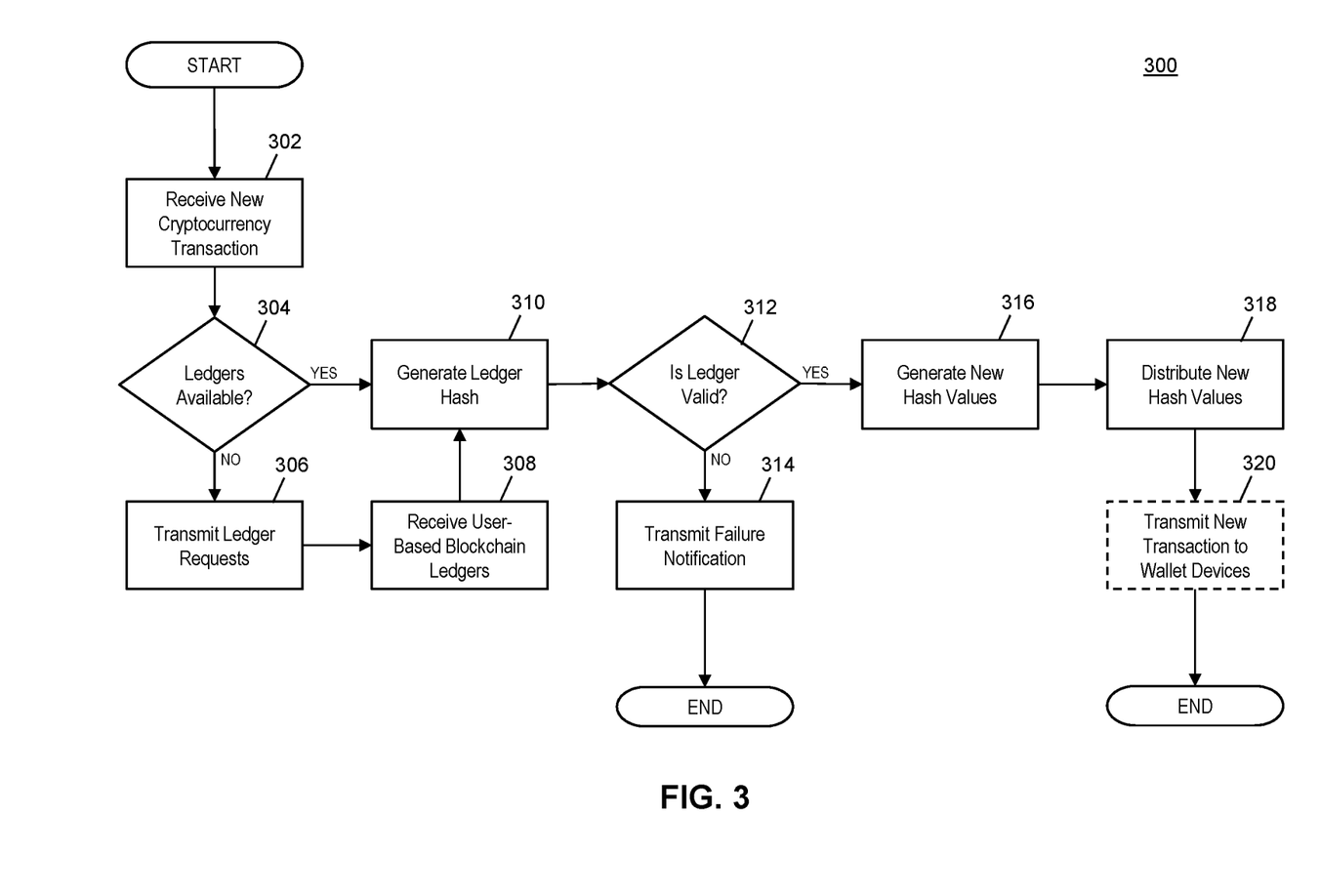
FIG. 3 is a flow diagram illustrating a process for processing a blockchain transaction using user-based ledgers in accordance with exemplary embodiments.

FIG. 3 illustrates a process 300 executed by a blockchain node 102 in the blockchain network 104 for the processing of a cryptographic currency blockchain transaction involving the use of user-based blockchain ledgers in the system 100 of FIG. 1, discussed above.

In step 302, the receiving device 202 of the blockchain node 102 may receive a new blockchain transaction from a sender device 106, submitting using a suitable communication network and method. The new blockchain transaction may include a public key for the sender device 106, a public key for the receiver device 108, and any other transaction data necessary for a blockchain transaction, such as a digital signature, unspent transaction outputs, destination addresses, cryptocurrency amounts, etc. In step 304, the blockchain node 102 may determine if copies of the user-based blockchain ledgers for each involved blockchain wallet are already available to the blockchain node 102. The ledgers may be available if, for instance, local copies are stored in the blockchain data 210 or wallet profiles 208 in the wallet database 206 that include the related public keys, or if the submission from the sender device 106 included the user-based blockchain ledgers for the sender device 106 and the receiver device 108.

If the blockchain node 102 does not already have the user-based ledgers, then, in step 306, the transmitting device 220 of the blockchain node 102 may electronically transmit a ledger request that includes the public key of the associated blockchain wallet to the computing device of the associated blockchain wallet, or to another blockchain node 102 that has updated copies of the user-based blockchain as associated with the public key. In step 308, the receiving device 202 of the blockchain node 102 may receive an updated copy of the user-based blockchain ledger from the appropriate computing device or other blockchain node 102.

In step 310, the generation module 216 of the blockchain node 102 may generate a hash value using the updated copy of the blockchain ledger for each involved blockchain wallet. If, in step 304, the blockchain node 102 determines that copies of the user-based blockchain ledgers for each involved blockchain wallet are already available to the blockchain node 102, process 300 proceeds directly to step 310, bypassing steps 306 and 308. In step 312, the validation module 218 of the blockchain node 102 may attempt to validate the hash value for each user-based blockchain ledger as compared to a hash value stored in the associated wallet profile 208 or a blockchain data value in the main blockchain identified using the public key. If the values match, then the user-based blockchain ledger is considered validated by the blockchain node 102. If the validation fails, then, in step 314, the transmitting device 220 of the blockchain node 102 may electronically transmit a notification message to the sender device 106 indicated that the validation of one or more of the user-based blockchain ledgers failed. The sender device 106 may then contact the receiver device 108 and attempt to re-submit the transaction after obtaining an updated or more accurate copy of the appropriate user-based blockchain.

If the validation of the user-based blockchain ledgers are successful, through the hash values, then, in step 316, the generation module 216 of the blockchain node 102 may generate a new hash value for each of the user-based blockchain ledgers. Generation of the new hash values may include confirmation of the blockchain transaction using traditional methods, generation of a blockchain data value for each user-based ledger, and generation and confirmation of a new block for each user-based blockchain ledger that includes the new blockchain data value, where the hash value is generated by applying a hashing algorithm to the updated user-based blockchain. In step 318, the transmitting device 220 of the blockchain node 102 may distribute the new hash values generated for each involved blockchain wallet to other blockchain nodes 102 in the blockchain network 104 with the associated public key for updating of wallet profiles 208 and/or the main blockchain. In some embodiments, the process 300 may also include step 320, where the transmitting device 220 of the blockchain node 102 may electronically transmit the new blockchain data value or updated user-based blockchain to the associated computing devices (e.g., sender device 106 and receiver device 108). In other embodiments, the sender device 106 and receiver device 108 may update their own user-based blockchains as each may have all of the transaction data necessary for generating the new blockchain data value and updating the blockchain accordingly.

Exemplary Method for Processing Cryptocurrency Transactions

Figure 4:
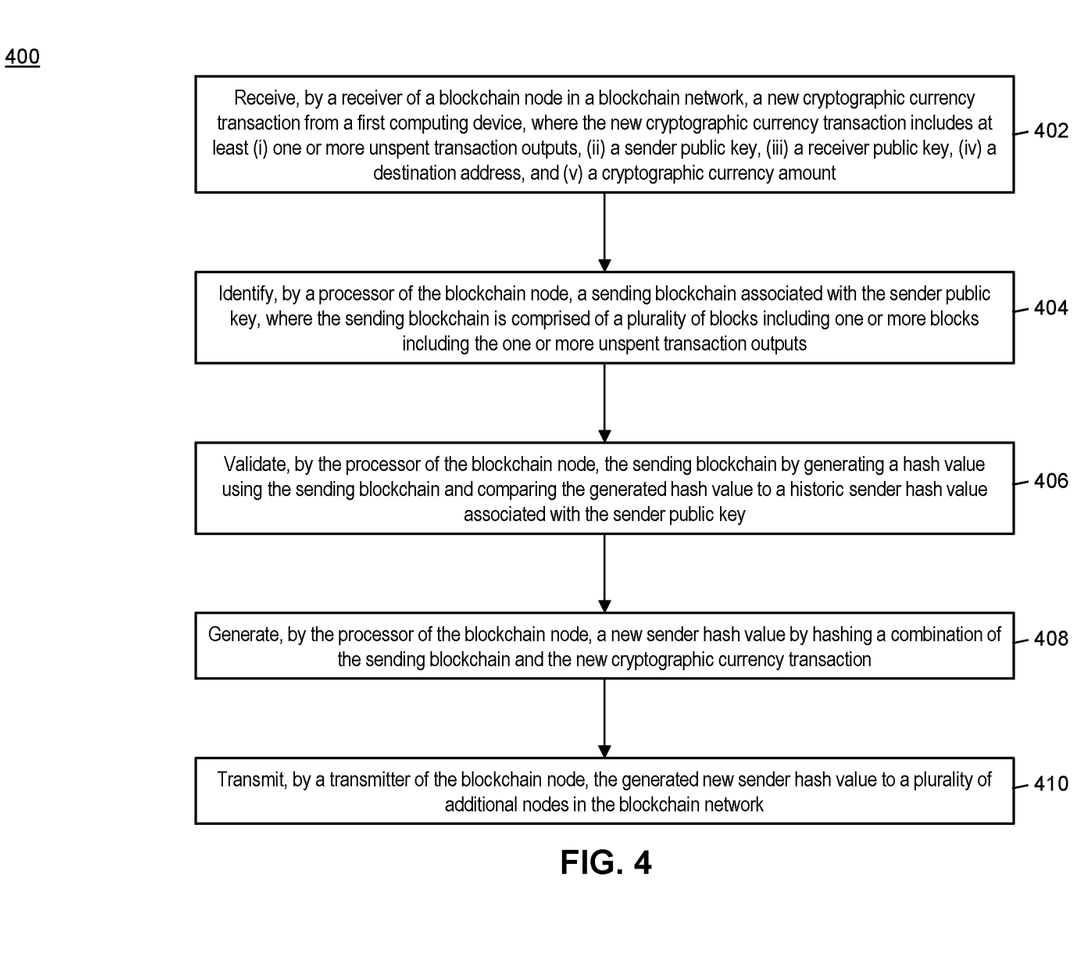
FIG. 4 is a flow chart illustrating an exemplary method for processing cryptographic currency transactions through user-based blockchain ledgers in accordance with exemplary embodiments.

FIG. 4 illustrates a method 400 for the processing of cryptographic currency transactions through user-based blockchains, where hash values are maintained in the blockchain network 104 to maintain accuracy and immutability in the blockchain.

In step 402, a new cryptographic currency transaction may be received by a receiver (e.g., receiving device 202) of a blockchain node (e.g., blockchain node 102) in a blockchain network (e.g., blockchain network 104) from a first computing device (e.g., sender device 106), where the new cryptographic currency transaction includes at least (i) one or more unspent transaction outputs, (ii) a sender public key, (iii) a receiver public key, (iv) a destination address, and (v) a cryptographic currency amount. In step 404, a sending blockchain associated with the sender public key may be identified by a processor (e.g., querying module 214) of the blockchain node, where the sending blockchain is comprised of a plurality of blocks including one or more blocks including the one or more unspent transaction outputs.

In step 406, the sending blockchain may be validated by the processor (e.g., validation module 218) of the blockchain node by generating a hash value using the sending blockchain and comparing the generated hash value to a historic sender hash value associated with the sender public key. In step 408, a new sender hash value may be generated by the processor (e.g., generation module 216) of the blockchain node by hashing a combination of the sending blockchain and the new cryptographic currency transaction. In step 410, the generated new sender hash value may be transmitted by a transmitter (e.g., transmitting device 220) of the blockchain node to a plurality of additional nodes in the blockchain network.

In one embodiment, the method 400 may further include transmitting, by the transmitter of the blockchain node, the new cryptographic currency transaction to the first computing device and a second computing device (e.g., receiver device 108), where the second computing device is associated with the receiver public key. In some embodiments, the combination of the sending blockchain and the new cryptographic currency transaction may be comprised of the sending blockchain and a new block in the sending blockchain that includes the new cryptographic currency transaction. In one embodiment, the historic sender hash value may be stored in a memory (e.g., memory 212) of the blockchain node in a data entry further including the sender public key.

In some embodiments, the historic sender hash value may be stored in a blockchain data value in a block included in a main blockchain managed by the blockchain network, the blockchain data value further including the sender public key. In one embodiment, identifying the sending blockchain may include transmitting, by the transmitter of the blockchain node, the sender public key to another node in the blockchain network and receiving, by the receiver of the blockchain node, the sending blockchain from the another node. In some embodiments, the new cryptographic currency transaction may be accompanied by the sending blockchain. In one embodiment, the historic sender hash value may be received, by the receiver of the blockchain node, from another node in the blockchain network.

Computer System Architecture

FIG. 5 illustrates a computer system 500 in which embodiments of the present disclosure, or portions thereof, may be implemented as computer-readable code. For example, the blockchain nodes 102 of FIGS. 1 and 2 may be implemented in the computer system 500 using hardware, non-transitory computer readable media having instructions stored thereon, or a combination thereof and may be implemented in one or more computer systems or other processing systems. Hardware may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for processing cryptographic currency transactions through user-based blockchain ledgers. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for processing cryptographic currency transactions through user-based blockchain ledgers, comprising:

receiving, by a receiver of a blockchain node in a blockchain network, a new cryptographic currency transaction from a first computing device, where the new cryptographic currency transaction includes at least (i) one or more unspent transaction outputs, (ii) a sender public key, (iii) a receiver public key, (iv) a destination address, and (v) a cryptographic currency amount;

identifying, by a processor of the blockchain node, a sending blockchain associated with the sender public key, where the sending blockchain is comprised of a plurality of blocks including one or more blocks including the one or more unspent transaction outputs;

validating, by the processor of the blockchain node, the sending blockchain by generating a hash value using the sending blockchain and comparing the generated hash value to a historic sender hash value associated with the sender public key;

generating, by the processor of the blockchain node, a new sender hash value by hashing a combination of the sending blockchain and the new cryptographic currency transaction; and transmitting, by a transmitter of the blockchain node, the generated new sender hash value to a plurality of additional nodes in the blockchain network.

2. The method of claim 1, further comprising:

transmitting, by the transmitter of the blockchain node, the new cryptographic currency transaction to the first computing device and a second computing device, where the second computing device is associated with the receiver public key.

3. The method of claim 1, wherein the combination of the sending blockchain and the new cryptographic currency transaction is comprised of the sending blockchain and a new block in the sending blockchain that includes the new cryptographic currency transaction.

4. The method of claim 1, wherein the historic sender hash value is stored in a memory of the blockchain node in a data entry further including the sender public key.

5. The method of claim 1, wherein the historic sender hash value is stored in a blockchain data value in a block included in a main blockchain managed by the blockchain network, the blockchain data value further including the sender public key.

6. The method of claim 1, wherein identifying the sending blockchain includes transmitting, by the transmitter of the blockchain node, the sender public key to another node in the blockchain network and receiving, by the receiver of the blockchain node, the sending blockchain from the another node.

7. The method of claim 1, wherein the new cryptographic currency transaction is accompanied by the sending blockchain.

8. The method of claim 1, wherein the historic sender hash value is received, by the receiver of the blockchain node, from another node in the blockchain network.

9. A system for processing cryptographic currency transactions through user-based blockchain ledgers, comprising:

a blockchain network;

a plurality of additional nodes included in the blockchain network;

a first computing device; and a blockchain node in the blockchain network including a receiver receiving a new cryptographic currency transaction from a first computing device, where the new cryptographic currency transaction includes at least (i) one or more unspent transaction outputs, (ii)

a sender public key, (iii) a receiver public key, (iv) a destination address, and (v) a cryptographic currency amount;

a processor
- identifying a sending blockchain associated with the sender public key, where the sending blockchain is comprised of a plurality of blocks including one or more blocks including the one or more unspent transaction outputs,
- validating the sending blockchain by generating a hash value using the sending blockchain and comparing the generated hash value to a historic sender hash value associated with the sender public key, and
- generating a new sender hash value by hashing a combination of the sending blockchain and the new cryptographic currency transaction, and a transmitter transmitting the generated new sender hash value to a plurality of additional nodes in the blockchain network.

10. The system of claim 9, wherein the transmitter of the blockchain node transmits the new cryptographic currency transaction to the first computing device and a second computing device, where the second computing device is associated with the receiver public key.

11. The system of claim 9, wherein the combination of the sending blockchain and the new cryptographic currency transaction is comprised of the sending blockchain and a new block in the sending blockchain that includes the new cryptographic currency transaction.

12. The system of claim 9, wherein the historic sender hash value is stored in a memory of the blockchain node in a data entry further including the sender public key.

13. The system of claim 9, wherein the historic sender hash value is stored in a blockchain data value in a block included in a main blockchain managed by the blockchain network, the blockchain data value further including the sender public key.

14. The system of claim 9, wherein identifying the sending blockchain includes transmitting, by the transmitter of the blockchain node, the sender public key to another node in the blockchain network and receiving, by the receiver of the blockchain node, the sending blockchain from the another node.

15. The system of claim 9, wherein the new cryptographic currency transaction is accompanied by the sending blockchain.

16. The system of claim 9, wherein the historic sender hash value is received, by the receiver of the blockchain node, from another node in the blockchain network.

* * * * *